(12) United States Patent  
DuBell-Shockley

(10) Patent No.: US 7,595,441 B1  
(45) Date of Patent: Sep. 29, 2009

(54) VIOLIN AND VIOLA TEACHING AID

(76) Inventor: Georgeann DuBell-Shockley, 910 W. Meadowmere Ln., Austin, TX (US) 78758

( * ) Notice: Subject to any disclaimer, the term of this patent is extended or adjusted under 35 U.S.C. 154(b) by 0 days.

(21) Appl. No.: 11/457,067

(22) Filed: Jul. 12, 2006

(51) Int. Cl.
*G10D 1/02* (2006.01)

(52) U.S. Cl. ...................................................... 84/282

(58) Field of Classification Search ........... 84/280–283, 84/274, 275
See application file for complete search history.

(56) References Cited

U.S. PATENT DOCUMENTS 1,897,225 A * 2/1933 Archer ......................... 84/282

| | | | | |
|---|---|---|---|---|
| 2,004,356 A | * | 6/1935 | Westman | 84/280 |
| 3,839,938 A | * | 10/1974 | Williams | 84/465 |
| D257,152 S | * | 9/1980 | Alshin | D17/20 |
| 5,755,631 A | * | 5/1998 | Paschka | 473/459 |

* cited by examiner

*Primary Examiner*—Kimberly R Lockett

(57) ABSTRACT

Violin or viola teaching aids are disclosed that are suitable to be attached to either a violin or viola bow. The aids with elongated raised ridges provide a tactile indication of the proper placement of the right hand on a bow. An embodiment is disclosed that has a cylindrical shape with a hollow passageway that fits over the stick of a bow. A plurality of holes provide lateral openings into the hollow passageway. The rims of the holes provide a tactile indication of the location in which the fingers and thumb are to contact the bow. Embodiments are disclosed that are comprised of resilient sponge rubber.

11 Claims, 4 Drawing Sheets

VIOLIN AND VIOLA TEACHING AID

FIELD OF THE INVENTION

The present invention relates to apparatus that assist students learning to play a violin or viola musical instrument.

BACKGROUND OF THE INVENTION

Mastery of a perfect bow hold and proper bowing motion is essential in learning to properly play a violin or viola. This involves the correct placement of the fingers and thumb on a bow as well as maintaining the correct bend of each finger and thumb.

Methods for teaching proper bow hold, commonly rely on a student visually observing the placement of the right hand on the bow and visually observing the bend of each finger and thumb. While such methods are useful in initially learning proper bow, students often have difficulty in continuously maintaining the proper bow hold. In a school environment it is common for the ratio of students to instructor to be quite large. It can be difficult for a single instructor to constantly visually critique the bow hold of a large number of students and it is common for considerable time to be spent on monitoring the student's bow hold.

A mechanism is needed that helps violin or viola students develop the habit of maintaining a proper bow hold while minimizing the need for the students to visually observe the bow hold. Preferably the mechanism minimally affects the feel of the bow and does not excessively constrain the fingers while stroking the violin or viola. In addition, a mechanism is needed that will accommodate a range of varying sized bows and hands and is easy to install, remove, and be used by junior high school aged children.

BRIEF SUMMARY OF THE INVENTION

Violin and viola teaching aids are disclosed that provide a tactile indication to the violin or viola user of the proper bow grip and reinforce visual methods of learning proper bow hold. Visual aids are disclosed that tend to direct hand placement for a perfect bow hold and direct the bend of each finger and thumb. Visual aids may promote a relaxed bow grip that does not overtly constrain the right hand while making proper violin/viola bowing motion.

A violin and viola teaching aid is disclosed that has a plurality of elongated ridges disposed to provide a tactile indication of the location on a bow in which each finger and thumb are to make contact. One embodiment of a violin teaching aid has a generally cylindrical outer surface and a hollow passageway extending axially that is disposed to receive a portion of a bow in the proximity of the bow frog. A plurality of holes that are adapted to receive the tip of one or more corresponding fingers or thumb provide a tactile indication of the desired location each finger or thumb contacts the bow.

Alternate suitable embodiments of a violin teaching aid may be formed of planar sheets. One embodiment is disclosed that is formed of a rectangular planar sheet adapted to be folded around the of stick 77 of a bow 70 to form a "U" shape.

BRIEF DESCRIPTION OF THE SEVERAL VIEWS OF THE DRAWING

The invention may best be understood by referring to the following description and accompanying drawings that are used to illustrate embodiments of the invention. In the drawings.

DETAILED DESCRIPTION OF THE INVENTION

In the following description, embodiments of the present invention are disclosed that are specifically designed for a violin. The methodologies of the present invention may be used to enable similar apparatuses designed for use with a viola. Numerous specific details are set forth to provide a thorough understanding of the invention, but it is understood that the invention may be practiced without these specific details. In other instances, well-known manufacturing methods, techniques, and physical structure have not been shown in detail in order not to obscure the invention.

Figure 1A:
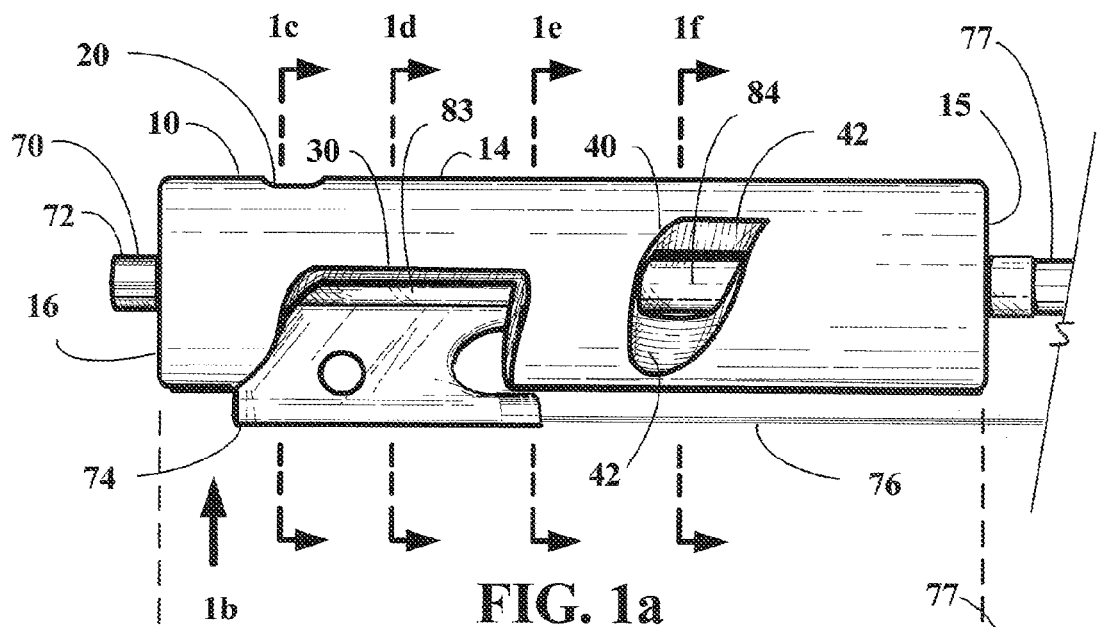
FIGS. 1a through 1f depict an embodiment of a violin teaching aid of the present invention.
Figure 1B:
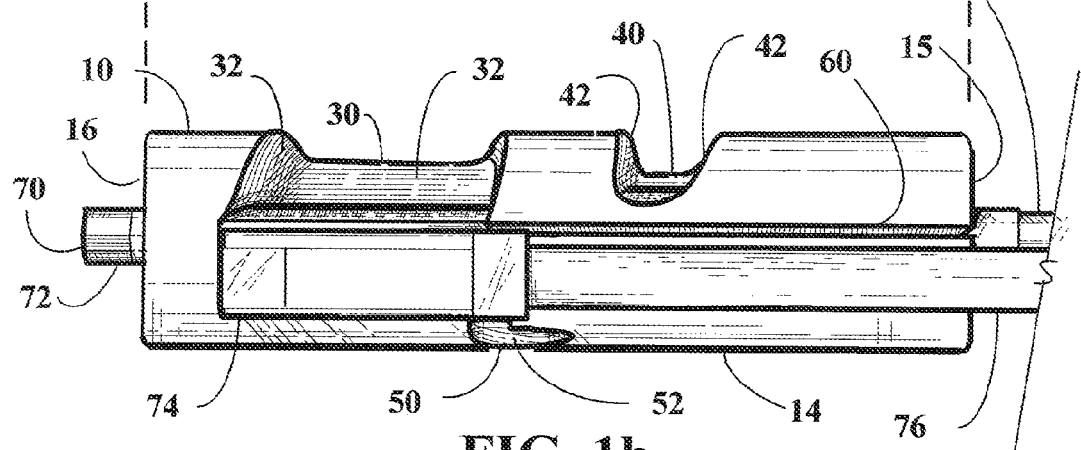
Figures 1C, 1D, 1E, 1F:
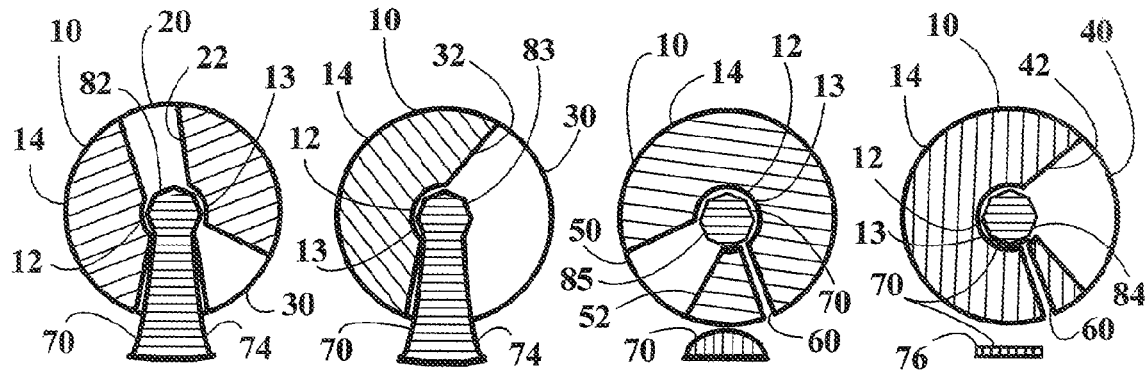
Figure 2A:
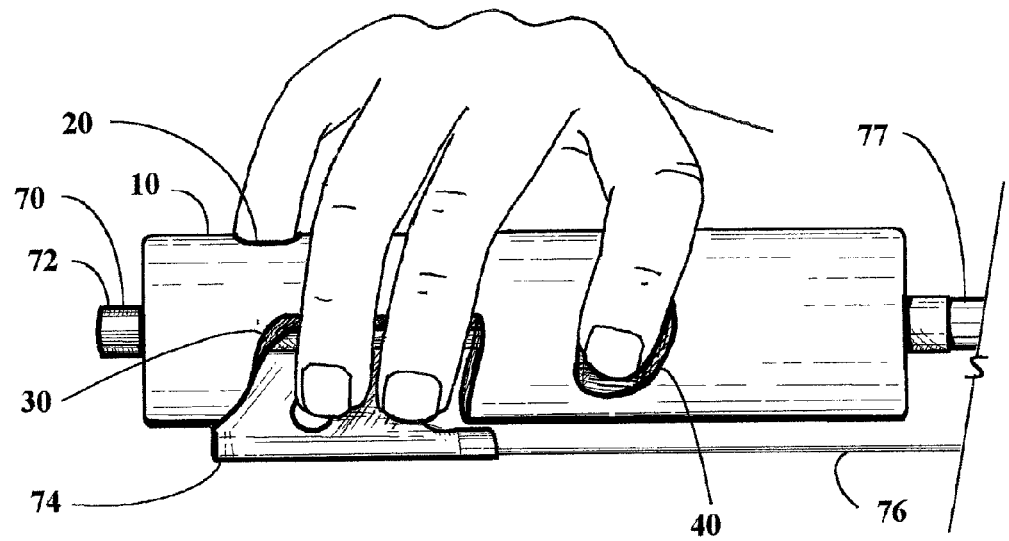
FIGS. 2a and 2b show examples of a hand gripping a bow while utilizing a violin teaching aid of the present invention.
Figure 2B:
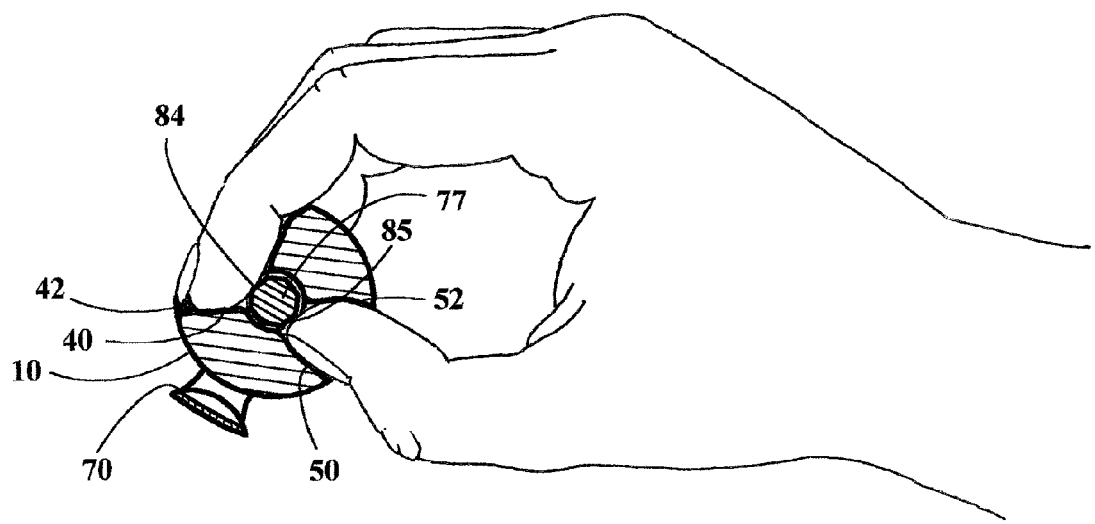

FIGS. 1 though 4 depict an embodiment of a violin teaching aid 10 of the present invention drawn approximately to scale. Violin teaching aid 10 is suitable to be removably attached to the stick of a violin bow 70 at a predetermined location on the violin bow in the proximity of the bow frog 74 such, for example, as shown in FIGS. 1a through 1f, and FIGS. 2a, 2b and 3. When installed on a violin bow, the violin teaching aid 10 provides a tactile indication of the desired placement of the right hand on the bow 70. FIG. 1b depicts a lower view of the violin teaching aid 10 and the bow 70, which are shown in FIG. 1a. FIGS. 1c through 1f illustrate the respective cross sectional views of FIG. 1a as indicated in FIG. 1a. FIGS. 2a and 2b show examples of a hand gripping a bow 70 in which the violin teaching aid 10 depicted in FIGS. 1a through 1f is installed.

In the embodiment shown in FIGS. 1a through 1f, violin teaching aid 10 has a generally tubular shape with a first end 15 and a second end 16 connected by a generally cylindrical outer surface 14 that is approximately 1.10 inches in diameter and a coaxial, generally cylindrical inner surface 12 that has an approximately 0.25 inches diameter. The cylindrical inner surface 12 delineates a hollow passageway 13 extending between the first and second ends 15, 16 that is adapted to fit snuggly around the stick of the bow 70 when teaching aid 10 is installed on a bow 70. FIGS. 1a through 1f depict violin teaching aid 10 installed on a bow. When installed on a bow 70, violin teaching aid 10 preferably remains stationary in relationship to the bow 70 during normal use. Optionally, the cylindrical inner surface 12 may have a slightly smaller diameter than the outer most diameter of the bow stick 77 to where the inner cylindrical surface 12 is expanded when violin teaching aid 10 is installed on a bow 70 to provide increased frictional resistance to movement between the violin teaching aid 10 and the bow 70.

A plurality of holes 20, 30, 40, 50 intersecting the inner and outer cylindrical surfaces provide lateral openings into the hollow passageway 13. Each hole 20, 30, 40, 50 is adapted to selectively receive the tip of one or more corresponding fingers or thumb of the right hand, when the violin teaching aid 10 is installed to a bow 70. The rim 22, 32, 42, 52 of each respective hole 20, 30, 40, 50 forms an elongated ridge 22, 32, 42, 52, which is raised above the surface of the bow stick with sufficient height so that the ridges 22, 32, 42, 52 are generally discernable by touch. Ridges 22, 32, 42, 52 provide a tactile indication of the respective location 82, 83, 84, 85 on the bow 70 in which the corresponding finger and thumb is to contact the bow 70.

In the disclosed embodiment, hole 20 is adapted to receive the little finger, hole 30 is adapted to receive the third and forth fingers and hole 50 is adapted to receive the thumb. The four holes 20, 30, 40, 50 cooperatively provide a tactile indication of the desired position of a hand used to grip a bow. Hole 30, which corresponds to the second and third finger of the right hand, is also adapted to receive the frog 74 of the violin bow 70 and tends to prevent the violin teaching aid 10 from sliding axially on the stick 77 of the bow 70. Alternative suitable embodiments may provide a hole for each finger of the right hand or may omit holes for one or more fingers or thumbs. Utilizing a single hole 30 to receive both the second and third finger as well as the frog 74 provides the advantage of making some visual aid embodiments easier to manufacture and easier to attach to a bow 70.

Optionally, the lateral contour of the ridges 22, 32, 42, 52 may provide a tactile indication of the desired angle in which the tip of the corresponding finger or thumb makes with the stick 77 of the bow 70. Directing the angle the tip of the finger or thumb makes with the stick 77 tends to determine the proper bend of the fingers and thumb. The bend and angular relationship of the fingers and thumb will properly vary as the right hand is moved forward and backward to make a stroke.

Preferably violin teaching aid 10 is light weight so that the additional weight of the aid 10 minimally affects the feel of the violin grip and stroke. It is advantageous for violin teaching aid 10 to be formed of sponge rubber or material having similar properties that is light weight. Furthermore, it is advantageous for the shape of holes 20, 30, 40, 50 to easily deformed as the right hand moves forward and backwards when stroking a violin so as to not excessively constrain the right hand gripping a bow 70 while maintaining the desired positional relationship of the right hand to the bow 70. The diameter of the outer cylindrical surface 14 is preferably less than 1.50 inches such that the outer cylindrical surface 14 does not interfere with the bow hairs 76 and preferably does not excessively constrain the fingers when the right hand is moved forward and backward while stroking the violin.

Suitable violin teaching aids 10 may be provided in a range of sizes to accommodate the varying sized bows 70 and hands. The embodiment of FIGS. 1a through 1f, which is shown approximately to scale, is adapted specifically to fit the range of bow sizes and small hands common to junior high school age children. Alternative embodiments include visual aids 10 formed of soft sponge rubber with very narrow holes 20, 30, 40, 50 that are adapted to expand when fingers are inserted. Alternative embodiments include holes 20, 30, 40, 50 with small diameters designed to snuggly fit thin fingers and to expand to accommodate slightly larger fingers.

The violin teaching aid 10 shown in FIGS. 1a through 1f and FIGS. 2 though 4 may be removably attached to the stick 77 of a violin bow 70. Violin teaching aid 10 has a slot 60 that is adapted to allow the violin teaching aid 10 to be attached or removed from a violin bow 70 without requiring the bow 70 to be disassembled. Slot 60 is a narrow opening into the hollow passageway 13 that extends from the opening 30 for the frog 74 to the first end 15. To install violin teaching aid 10 on a bow 70, the stick 77 of the bow 70 is inserted into the first end 15 of the hollow passageway 13, slot 60 is expanded while the frog 74 is inserted into slot 60. The violin teaching aid 10 is slid along the stick 77 to the desired position in which the frog 74 extends from opening 30 as shown in FIGS. 1a through 1f.

Figure 3:
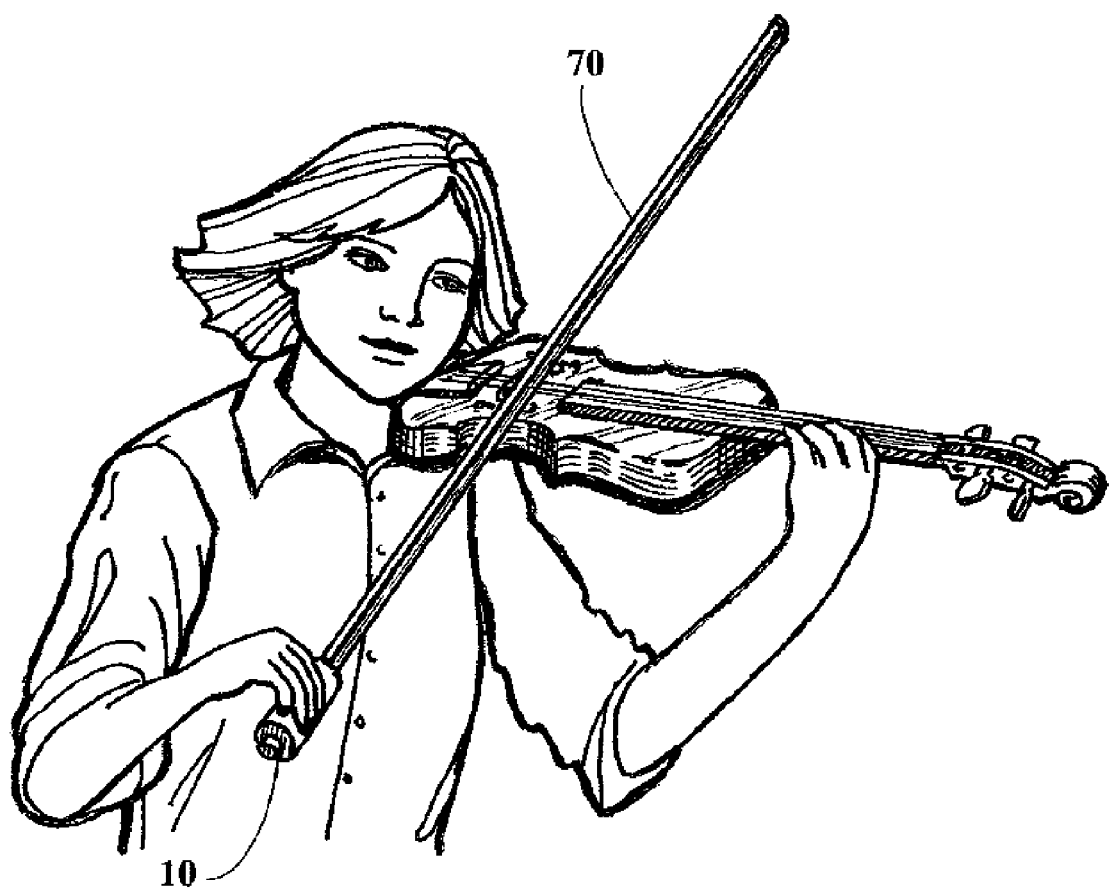
FIG. 3 shows a violin teaching aid of the present invention attached to bow.
Figure 4A:
FIG. 4b illustrates a violin teaching aid of the present invention attached to a bow-training-stick and FIG. 4a shows a bow-training-stick of the present invention.
Figure 4B:
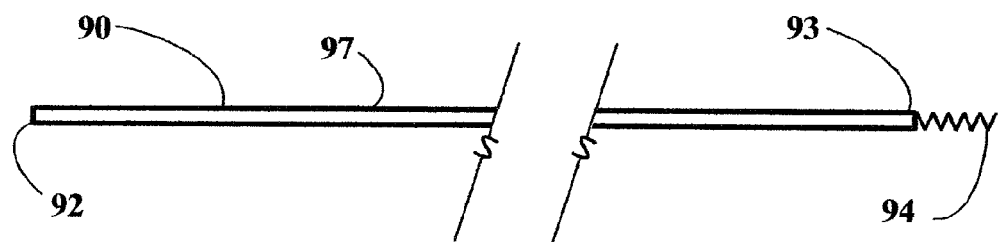

Now referring to FIGS. 3, 4a and 4b. FIG. 3 shows a violin teaching aid 10 of the present invention attached to on a bow 70 in a manner that provides a tactile indication of a desired position of a hand used to grip a the bow 70 while the bow 70 is used to stroke a violin.

FIG. 4b illustrates a violin teaching aid 10 of the present invention installed in a bow-training-stick 90 in a manner that allows the movement of stroking a violin to be simulated for teaching proper bow 70 movement. FIG. 4a shows a larger view of a bow-training-stick 90, which comprises an elongated rod 97 with a first end 92 and a second end 93. A helical spring 94 is affixed to the second end 93 of the elongated rod 97. The helical spring 94 is adapted to be inserted under the strings of a violin and remain affixed to the violin while a violin stroke is simulated. To install a violin teaching aid 10 on a bow-training-stick 90, insert the bow-training-stick 90 into the hollow passageway of the violin teaching aid 10. When installed, a violin teaching aid 10 is slidingly attached to the bow-training-stick 90. To simulate the bow 70 stroke of a violin, the right hand lightly grips the bow-training-stick 90, as shown in FIG. 4a, with each finger and thumb received into the corresponding holes 20, 30, 40, 50 (shown in FIG. 1a) of the violin teaching aid 10 and then the right hand is moved towards and then away from the violin while the violin teaching aid 10 slides in tandem with the violin teaching aid 10 along the bow-training-stick 90.

A method of the present invention for proving tactile indication of a desired position of a hand used to grip a bow 70 includes the steps of: (1) providing a violin teaching aid comprising a support structure adapted to be removably attached to a violin bow 70 at a predetermined location on the violin bow 70 in the proximity of the bow frog 74 and formed with a plurality of ridges 22, 32, 42, 52 (shown in FIGS. 1a through 1f), wherein each ridge 22, 32, 42, 52, is adapted to receive the tip of one or more corresponding fingers or thumb of the right hand to direct the desired location in which each finger and thumb is to make contact with the violin bow 70; (2) providing an elongated rod such as a violin bow 70, viola bow (now shown), or bow-training-stick 90; (3) attaching the violin teaching aid to the elongated rod 90; and (5) stroking the violin or viola with the bow or simulating the movement of stroking.

I claim:

1. A teaching aid suitable to be selectively attached to one of a violin or viola bow in the proximity of the bow frog for proving tactile indication of a desired position of a hand used to grip the bow, the teaching aid comprising:

a support structure adapted to be removably attached to the bow at a predetermined location on the bow in the proximity of the bow frog, wherein the support structure is adapted to be removably attached to the bow without requiring some disassembly of the bow; and a plurality of elongated ridges rigidly affixed to the support structure, wherein each ridge is adapted to receive the tip of one or more corresponding fingers or thumb of a hand used to grip the bow to provide a tactile indication of a predetermined location on the bow in which a corresponding finger or thumb is to make contact with the bow.

2. A teaching aid suitable to be selectively attached to one of a violin or viola bow in the proximity of the bow frog for proving tactile indication of a desired position of a hand used to grip the bow, the teaching aid comprising:

a support structure adapted to be removably attached to the bow at a predetermined location on the bow in the proximity of the bow frog, wherein the support structure is formed of sponge rubber; and a plurality of elongated ridges rigidly affixed to the support structure, wherein each ridge is adapted to receive the tip of one or more corresponding fingers or thumb of a hand used to grip the bow to provide a tactile indication of a predetermined location on the bow in which a corresponding finger or thumb is to make contact with the bow.

3. A teaching aid suitable to be attached to the stick of one of a violin or viola bow in the proximity of the bow frog for proving tactile indication of a desired position of a hand used to grip the bow, the teaching aid comprising:

a generally cylindrical outer surface;

a cylindrical inner surface generally co-axial with the cylindrical outer surface that delineates a hollow passageway disposed to receive the stick of the bow a plurality of holes that provide lateral openings into the hollow passageway and are each disposed to receive one or more corresponding fingers or thumb and wherein the rim of each hole is disposed to provide a tactile indication of the desired location on the bow in which the one or more corresponding fingers or thumb contacts the bow, when aid is installed on the bow, wherein teaching aid is predominantly comprised of resilient material adapted to distort when used to make a stroke.

4. The teaching aid of claim 3, wherein said plurality of holes are disposed to cooperatively provide a tactile indication of the desired position of four fingers and a thumb of a hand used to grip the bow.

5. The teaching aid of claim 3, wherein the diameter of the generally cylindrical outer surface is less than 1.50 inches.

6. The teaching aid of claim 3, wherein the diameter of the generally cylindrical outer surface is approximately 1.10 inches plus or minus 0.20 inches.

7. The teaching aid of claim 3, wherein the teaching aid is comprised predominately of sponge rubber.

8. The teaching aid of claim 3, wherein the teaching aid is comprised of soft sponge rubber and wherein said plurality of holes are disposed to expand when a finger is inserted.

9. The teaching aid of claim 3, wherein one of said plurality of holes that corresponds to the second and third finger of the right hand is adapted to receive the frog of the bow.

10. The teaching aid of claim 3, further comprising:

an opening into the hollow passageway that is adapted to allow the teaching aid to be attached to or removed from to the bow without requiring some disassembly of the bow.

11. The teaching aid of claim 3, wherein at least one rim has a lateral contour adapted to indicate a predetermined angle the tip one or more corresponding fingers or thumb makes with the bow.

* * * * *